US011369093B2

(12) United States Patent
Kanwal et al.

(10) Patent No.: US 11,369,093 B2
(45) Date of Patent: Jun. 28, 2022

(54) SYSTEMS AND METHODS FOR AUTOMATED CONTROL OF ANIMAL TRAINING AND DISCRIMINATION LEARNING

(71) Applicant: Georgetown University, Washington, DC (US)

(72) Inventors: Jagmeet S. Kanwal, Vienna, VA (US); Bishen J. Singh, Potomac, MD (US)

(73) Assignee: Georgetown University, Washington, DC (US)

( * ) Notice: Subject to any disclaimer, the term of this patent is extended or adjusted under 35 U.S.C. 154(b) by 164 days.

(21) Appl. No.: 16/749,930

(22) Filed: Jan. 22, 2020

(65) Prior Publication Data

US 2020/0154682 A1    May 21, 2020

Related U.S. Application Data

(63) Continuation of application No. 15/280,663, filed on Sep. 29, 2016, now Pat. No. 10,568,305.

(60) Provisional application No. 62/233,619, filed on Sep. 28, 2015.

(51) Int. Cl.

| | | |
|---|---|---|
| *A01K 63/00* | (2017.01) | |
| *A01K 63/06* | (2006.01) | |
| *A01K 1/03* | (2006.01) | |
| *A01K 61/85* | (2017.01) | |
| *H04N 7/18* | (2006.01) | |
| *B25J 11/00* | (2006.01) | |
| *G06V 40/10* | (2022.01) | |

(52) U.S. Cl.
CPC .............. *A01K 63/003* (2013.01); *A01K 1/03* (2013.01); *A01K 61/85* (2017.01); *A01K 63/06* (2013.01); *B25J 11/00* (2013.01); *G06V 40/103* (2022.01); *H04N 7/183* (2013.01)

(58) Field of Classification Search
CPC ........ A01K 1/03; A01K 61/85; A01K 63/003; A01K 63/06; G05B 19/406; G05B 2219/45111; G05B 2219/45113; G06K 9/00369; H04N 7/183
USPC ........................................................ 119/230
See application file for complete search history.

(56) References Cited

U.S. PATENT DOCUMENTS

| | | |
|---|---|---|
| 3,717,125 A | 2/1973 | Sanders |
| 4,448,150 A | 5/1984 | Catsimpoolas |
| 4,837,989 A | 6/1989 | Levy |
| 5,282,178 A | 1/1994 | Hill et al. |
| 5,823,141 A | 10/1998 | Pittet et al. |
| 6,095,927 A | 8/2000 | Malone |
| 6,427,628 B1 | 8/2002 | Reece |
| 6,837,184 B2 | 1/2005 | Gondhalekar et al. |
| 2003/0004652 A1 | 1/2003 | Brunner et al. |
| 2005/0115506 A1 | 6/2005 | Van den Berg et al. |

(Continued)

OTHER PUBLICATIONS

Manabe et al., "Differential reinforcement of an approach response in zebrafish (*Danio rerio*)," *Behavioural Processes* 98: 106-111, May 2013.

*Primary Examiner* — Brady W Frazier
(74) *Attorney, Agent, or Firm* — Klarquist Sparkman, LLP

(57) ABSTRACT

Monitoring systems and methods for tracking movement of one or more animals in an enclosure, such as a fish tank, include introducing various stimuli, such as food, light, and auditory stimuli, and tracking the movement of the animals in response to these stimuli. Movement patterns of the animals can be determined and analyzed from data obtain from cameras that record images/videos of the relevant portions of the enclosure.

18 Claims, 10 Drawing Sheets

(56) References Cited

U.S. PATENT DOCUMENTS

2009/0229532 A1 9/2009 Herbert et al.
2012/0180731 A1 7/2012 Garner et al.

FIG. 4B

SYSTEMS AND METHODS FOR AUTOMATED CONTROL OF ANIMAL TRAINING AND DISCRIMINATION LEARNING

CROSS REFERENCE TO RELATED APPLICATIONS

This application is a continuation of U.S. patent application Ser. No. 15/280,663, filed Sep. 29, 2016, which claims the benefit of U.S. Provisional Patent Application No. 62/233,619, filed Sep. 28, 2015. A petition to restore priority under 37 C.F.R. 1.78(b) was filed with U.S. patent application Ser. No. 15/280,663 and granted on Oct. 12, 2016. The prior applications are incorporated herein by reference in their entirety.

FIELD

This application is directed to the monitoring and analysis of laboratory animals, and, in particular, to the automated control of animal training and discrimination learning systems.

BACKGROUND

Behavioral assays can be used to measure various types of learning and to conduct behavioral research in different animal species. Conventional assays, however, require frequent human intervention, which can be time consuming and costly. In addition, human intervention in animal handling can stress the animals and interfere with the data and results of such assays. Accordingly, improvements to behavioral assays, such as those that minimizes stress and provide reliable systems for training and testing animals, such as zebrafish, for their ability to discriminate between sensory stimuli are desirable.

SUMMARY

In one embodiment, a monitoring system is provided for tracking movement of one or more animals (e.g., zebrafish). The system can include an enclosure configured to contain the one or more animals, at least two sensors positioned within the enclosure, a feeder system configured to deliver a food reward into the enclosure, a camera configured to record the one or more animals in the enclosure, and a control system configured to receive an input from the at least two sensors and control the delivery of the food reward from the feeder system based on the input. One or more proximity sensors can be provided to detect the presence of the one or more animals at one or more target locations.

The monitoring system of claim 1, wherein the at least one proximity sensor comprises a reflector and is configured to detect the presence of the one or more animals at the target location when a signal from the proximity sensor to the reflector is interrupted.

The monitoring system of claim 2, further comprising at least one auditory and/or visual stimulus device configured to introduce a respective sound and/or light stimulus in response a detection of the presence or absence of the one or more animals at the target location.

In some embodiments, the camera is positioned below the enclosure to capture images of the one or more animals in the enclosure. The feeder system can include a food-containing portion and a food-delivery member that, upon receiving a food-delivery signal from the control system, causes the delivery of the food reward from the food-containing portion to the enclosure.

In other embodiments, the feeder system can include a positioning member that is configured to move the food-delivery member from a first position to a second position, wherein the movement from the first position to the second position permits the food reward to be delivered in different areas of the enclosure. The feeder system can be configured to receive a positioning signal from the control system to adjust the location of the food-delivery member. The positioning member can also include one or more motors that are configured to adjust the location of the food-delivery member by rotating a feeder arm.

In some embodiments, the enclosure can be a fish tank, such as a circular tank with a clear bottom. Various light and/or auditory stimuli devices can be included. For example, an underwater output transducer can be configured to produce a sound output within the enclosure, and one or more LED members can be provided to produce the same or different types of light within the enclosure.

In some embodiments, a tracking system is configured to receive a plurality of images from the camera and determine a movement pattern of respective ones of the one or more animals. Results of the determined movement patterns can be displayed on a display screen.

In another embodiment, a method of tracking the movement of one or more animal is provided. The method can include introducing one or more animals into an enclosure, detecting the presence of the one or more animals in at least two areas of the enclosure using at least one proximity sensor, delivering a food reward into the enclosure using a feeder system upon detecting the presence of the one or more animals in at least one target location, and recording the movement of the one or more animals in the enclosure using a camera.

The one or more proximity sensors can include a reflector and can be configured to detect the presence of the one or more animals at the target location when a signal from the proximity sensor to the reflector is interrupted. In some embodiments, the method can also include introducing at least one auditory and/or visual stimuli in to the enclosure in response a detection of the presence or absence of the one or more animals at the target location.

In some embodiments, the enclosure can include a transparent bottom and recording of the movement can be performed by a camera positioned below the enclosure. The delivery of the food reward can include receiving a food-delivery signal from a control system based on the detected presence of the one or more animals in at least one of the two areas, and delivering the food reward from a food-containing portion of the feeder system to the enclosure. A positioning signal can be received from a control system, causing a positioning member of the feeder system to move from a first position to a second position in response to the positioning signal to change the location, thereby delivering the food reward in a different location from that associated with the first position.

In other embodiments, the enclosure can be a fish tank with a circular enclosure with a clear bottom, and the introducing of the one or more animals into the enclosure includes introducing fish into the fish tank. Auditory and/or light stimuli can be presented in the enclosure at predetermined times relative to the delivery of the food reward. The presentation of light stimuli can be from at least two LED members and can include different types (e.g., colors or intensities) of light. The presentation of auditory stimuli can be from an underwater sound based on a predetermined sound file. The method can also include determining a movement pattern of respective ones of the one or more animals from a plurality of images received from the camera. The determined movement patterns can be displayed on a display screen.

In other embodiments, the method can include scheduling a training program by selecting a schedule of recording times, selecting the type and schedule of the auditory and/or light stimuli, and selecting a manner in which the feed reward is delivered into the enclosure.

The systems and methods described herein can be used for training animals using, for example, either classical or operant conditioning. In some embodiments, learning can also be tracked using the timing of angular (turning angle) and translational (swim trajectories), and/or using the position and posture of individuals. Such methods and systems can facilitate, for example, comparison of performance within and across a cohort of animals.

The foregoing and other objects, features, and advantages of the invention will become more apparent from the following detailed description, which proceeds with reference to the accompanying figures.

BRIEF DESCRIPTION OF THE DRAWINGS

FIGS. 4A and 4B illustrate screen captures of an exemplary user interface for controlling a training schedule and the associated control of actions and sensors relating to the training itself.

DETAILED DESCRIPTION

Figure 1:
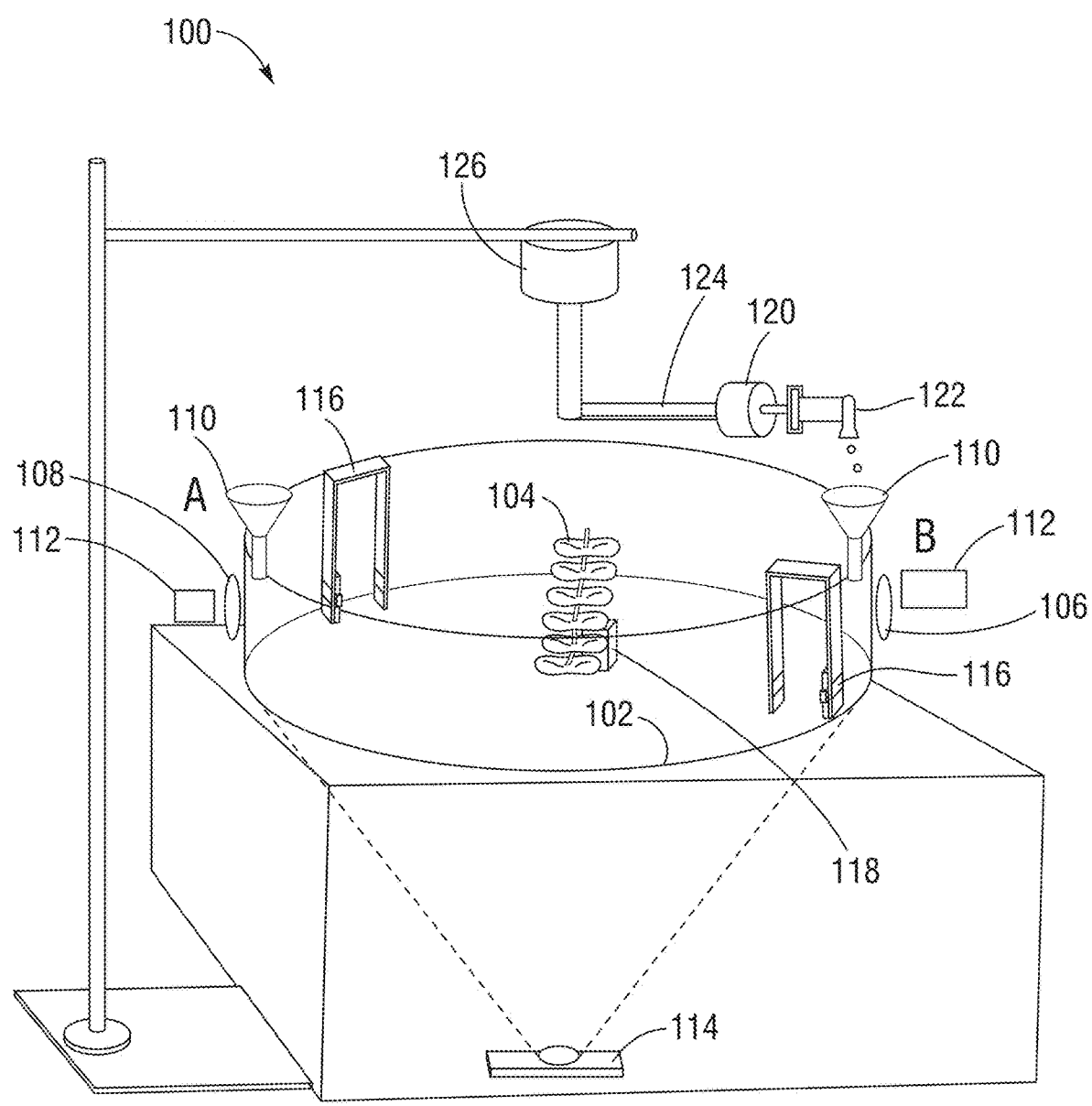
FIG. 1 is a diagrammatic representation of the audiovisual training apparatus for performing individual and group training/testing trials on stimulus-directed swimming.

As used in this application and in the claims, the singular forms "a," "an," and "the" include the plural forms unless the context clearly dictates otherwise. Additionally, the term "includes" means "comprises." Further, the term "coupled" does not exclude the presence of intermediate elements between the coupled items.

The systems, apparatus, and methods described herein should not be construed as limiting in any way. Instead, the present disclosure is directed toward all novel and non-obvious features and aspects of the various disclosed embodiments, alone and in various combinations and sub-combinations with one another. The disclosed systems, methods, and apparatus are not limited to any specific aspect or feature or combinations thereof, nor do the disclosed systems, methods, and apparatus require that any one or more specific advantages be present or problems be solved. Any theories of operation are to facilitate explanation, but the disclosed systems, methods, and apparatus are not limited to such theories of operation.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed systems, methods, and apparatus can be used in conjunction with other systems, methods, and apparatus. Additionally, the description sometimes uses terms like "produce" and "provide" to describe the disclosed methods. These terms are high-level abstractions of the actual operations that are performed. The actual operations that correspond to these terms will vary depending on the particular implementation and are readily discernible by one of ordinary skill in the art.

As used herein, "control system" means a device or set of devices, including the associated hardware and software running those devices, which regulates or controls the behavior of other devices. In one embodiment, for example, it can be a computer which automatically or with a user interface controls other devices (such as the light or auditory stimuli devices, the feeder system, etc.) via electronic signals or wireless signals.

Systems and Methods for Training and Monitoring

Directed movement towards a target requires spatial working memory, including processing of sensory inputs and motivational drive. An animal may be trained to perform this task via associative (classical or operant) conditioning. For example, in a stimulus-driven, operant conditioning paradigm designed to train zebrafish, a pulse of light can be presented via LED's and/or sounds via an underwater transducer.

The zebrafish (*Danio rerio*) is a widely used model organism in the fields of genetics, oncology, developmental biology and more recently neurobiology. Growing evidence suggests that zebrafish can play an important role in elucidating the genetic and neural mechanisms underlying multiple neurological disorders, such as Alzheimer's, Parkinson's, and depression. This motivated us to develop an inexpensive and efficient method for automated training of individual as well as small cohorts of zebrafish. Since zebrafish exhibit many social behaviors, analogous to those present in humans, they are also excellent animal models for understanding the neural and genetic contributions to the onset of autism spectrum disorders. Furthermore, targeted gene mutations in combination with behavioral studies in this organism can contribute to our basic understanding of particular neural circuits involved in learning, recall and decision-making.

Although the examples discussed below involve training zebrafish on audiovisual tasks, the systems and methods disclosed herein (including the graphical, user-friendly interfaces) can be used with other setups for behavioral training in other species.

A tracking system, such as a webcam placed below a glass tank, can record the fish swimming behavior. During certain operant conditioning, for example, a fish must interrupt an infrared beam at one location to obtain a small food reward at the same or different location. In some embodiments, for example, a timing-gated interrupt activates robotic-arm and feeder stepper motors via custom software controlling a microprocessor (e.g., Ardulink, a JAVA facility, for implementing Arduino-computer communication protocols). In this way, full automation of stimulus-conditioned directional swimming can be achieved. In addition, precise multi-day scheduling of training, including timing, location and intensity of stimulus parameters, and feeder control can be accomplished via a user-friendly interface, such as that disclosed herein.

In certain embodiments of the systems and methods disclosed herein, the disclosed training paradigms permit tracking of learning by monitoring swimming, turning, location, and/or response times of individual fish. This can facilitate comparisons of performance within and across a cohort of animals.

In some embodiments, methods and systems are disclosed for training and testing zebrafish using visual and/or auditory stimuli. In addition, relatively simple yet flexible paradigms are disclosed that utilize reliable apparatuses and minimal human intervention.

In some embodiments, the scheduling and control software and apparatus can be used to screen neurologic drugs and test the effects of CRISPR-based and optogenetic modification of neural circuits on sensation, locomotion, learning and memory.

As discussed in more detail below, the training methods and behavioral assay systems disclosed herein utilize reward-based, stimulus-triggered spatial responses in freely moving animals. In the case of fish, this translates into directional swimming activity. The apparatus can be fully controlled by computer software communicating with a microcontroller that can be easily programmed through a graphical, user-friendly interface. For example, the custom software, which can be implemented in JAVA, can be used to generate event-synchronized, short (e.g., 10 s to 30 s) video data files that can be analyzed using automated imaging software.

The training and testing apparatus together with the scheduling and control software can communicate with an external microprocessor (e.g., Arduino UNO). In some embodiments, rather than downloading scripts (sketches) into the Arduino, the code can be implement in JAVA so that it can run on a conventional desktop computer, with upgradeable, faster processing, high resolution video recording, wireless transmission and cloud storage capabilities that are well beyond that of an Arduino.

Using the systems and methods disclosed herein, zebrafish (and other animals) can be trained to respond to and/or discriminate between LEDs and/or auditory cues such as pure tones, frequency, amplitude, and/or intensity modulated sounds, and complex natural sounds, such as frog croaks and catfish barks. In addition, both auditory and visual training are possible by means of a fully programmable, schedule-based combination of proximity sensors, LEDs, and output transducer. Using either a unique food delivery setup or electrical stimulation, reward- or fear-based conditioning can be implemented to train fish and test fish behavior, learning, and decision-making. For data collection and analysis, automated image acquisition and analysis software can also be utilized.

Training Apparatus and Exemplary Operation

Experiments were conducted in a quiet, light-controlled (14:10 light-dark cycle; ambient light 14 Lux) room to minimize external auditory and visual cues. Experimental animals were transported from the core zebrafish facility at Georgetown University and placed in an acclimation tank. They were introduced into the experimental tank at the end of their normal feeding interval of 3 days so that they were motivated to explore and seek a food reward. This also minimized any stress from handling and transportation between housing and acclimation tanks in the experimental room.

FIG. 1 is a diagrammatic representation of the audio-visual training apparatus 100 for performing individual and group training/testing trials on stimulus-directed swimming. The fish tank 102 comprises the training environment, and can be, for example, a circular, glass tank as shown in FIG. 1. The size of the tank can vary. In one embodiment, the tank is sized between about 6-18 inches in diameter and between about 3-6 inches deep (e.g., 12"×4").

A plant 104 (artificial or real) can be placed in the tank, such as at the center of the tank, to simulate a somewhat naturalistic environment and provide fish with a point of orientation. Using filters, the experimental tank 102 can be uniformly lit to maximize fish vs. background contrast. Reflections from the tank's walls can be reduced by using an adhesive opaque lining (not shown). This can also help reduce unwanted, outside visual cues for the fish. Either a red or green colored plastic sheet 106, 108 was permanently mounted on opposite sides of the tank behind each feeder port 110, adjacent a respective LED 112.

A camera 114 (e.g., a Logitech HD Pro Webcam) can be positioned below tank 102 at a distance sufficient to capture the entire view of the tank 102 with the field of view of the camera. The bottom of tank 102 can be clear (e.g., made of glass or some other material that is sufficiently transparent) to allow the camera to capture images of the zebrafish (or other animals) moving within the tank. In one embodiment, the camera 114 can be between about 20-40 inches (e.g., 30 inches) below tank 102. The placement of the camera below the tank eliminates the problem of occlusion of the image by the above-tank sensor and feeder apparatuses; however, other placements of the camera are possible.

The training tank contained two motion sensors 116 (e.g., one on each opposing side of the tank), a thermometer probe, and an aerator. An underwater output transducer 118 (e.g., model M-10, Lubell Labs, Inc.) can be placed in the center (or other desired position) of tank 102 to produce sound output from selected sound files. Sounds can be presented at various sound pressure levels, such as 63 dB, as measured through a sound level meter (e.g., model 407735, Extech Instruments, Inc).

Figure 2:
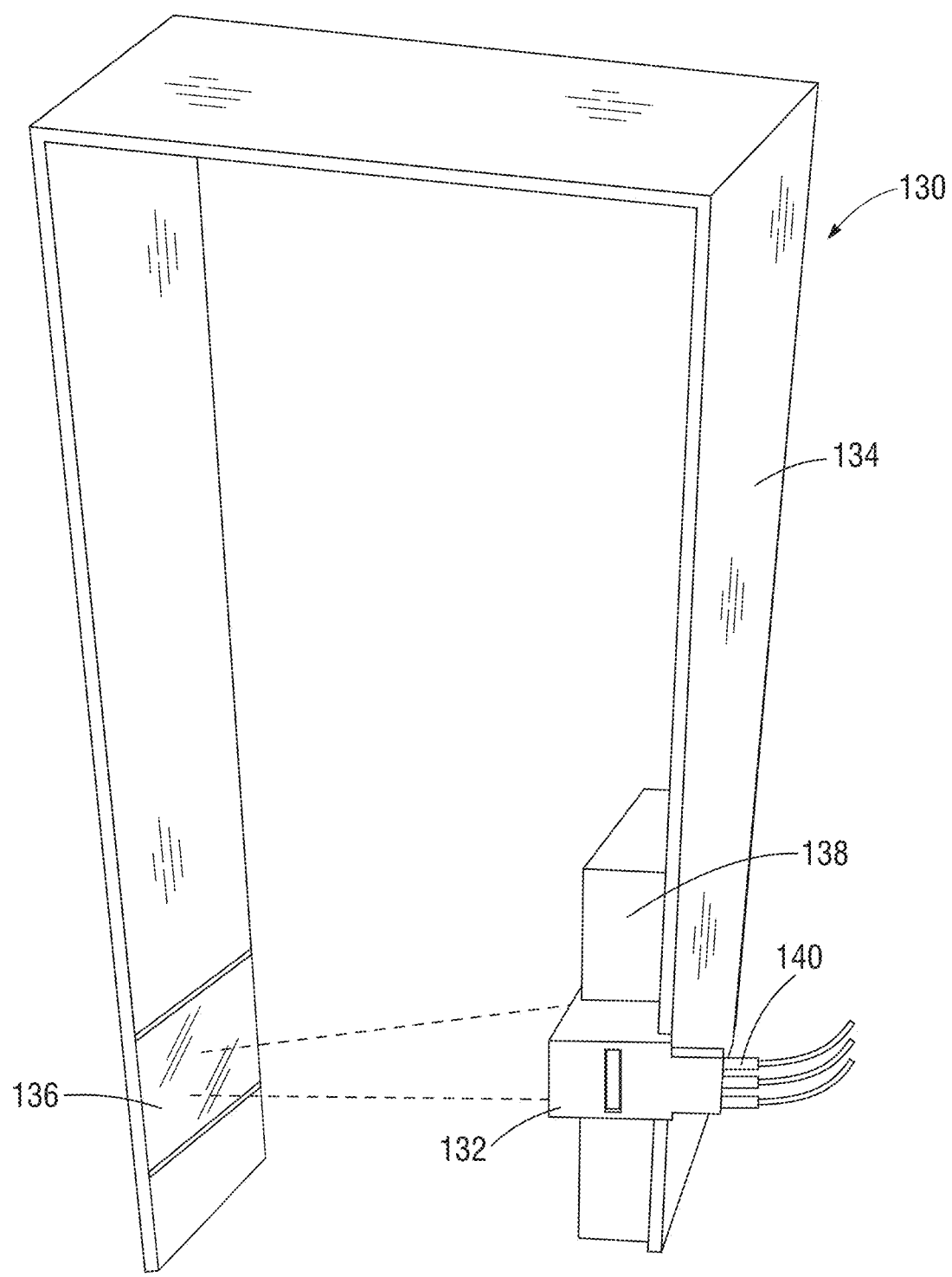
FIG. 2 illustrates an exemplary proximity sensor for use with the systems and methods disclosed herein.

Various types of motion sensors or other positioning detection devices can be used to identify the presence of an animal in a particular location. In one embodiment, for example, the motion sensors comprise gate-type sensors and the passing of an animal through the gate is the action that triggers the sensing of the presence of the animal in the desired target area (i.e., the area between the two sides of the gate). FIG. 2 illustrates additional details on an exemplary sensor system. As shown in FIG. 2, sensor system 130 comprises a sensor 132 coupled to a gate member 134 (e.g., a sensor holder). Sensor 132 can comprises a non-contact sensor that can detect the presence of and/or movement of an animal in the immediate vicinity of the sensor. In one embodiment, sensor 132 can detect an object in combination with a reflector 136 that is spaced apart from the sensor on another side (or leg) of the gate member 134. The sensor system 130 could be positioned so that the reflector 136 is located inside the wall of the enclosure, whereas sensor 132 is located outside the wall of the enclosure. This configuration could be useful in situations where the enclosure contains water (e.g. a water tank) to avoid exposing the sensor 132 to water.

One or more sensor mounting members 138 can be provided to facilitate the coupling of sensor 132 to gate member 134. Sensor 132 can be coupled to a control system that receives signals from the sensor to control and/or direct other actions (e.g., distribution of feed rewards or introduction of other stimuli as discussed herein). The coupling of the sensor to the control system can be achieved by a connector 140 that is configured to communicate signals from the sensor to the control system via wires or wireless connections. The sensor system 130 could be operated such that the reflection of the signal indicates the absence of the animal, whereas a break in the reflection and loss of the signal indicates the presence of the animal. Although this may be in opposite to the conventional operation of the sensor 132, it can be useful in situations where the enclosure contains water (i.e. the water interferes with the conventional operation of the sensor 132).

In some embodiments, the target area (presence-sensing area) can be adjacent a feed area as shown in FIG. 1. Alternatively, the target area can be positioned at a desired distance from the feed area and/or in the vicinity of other stimuli (e.g., visual or auditory stimuli).

Feeding ports 110 can be located on opposite sides of the circular tank 102 (e.g., between about 170-190 (e.g., about 180) degrees apart. Feeding ports 110 can include funnels (as shown in FIG. 1) mounted above the tank and translucent plastic strips affixed at corresponding locations on the walls of the tank to secure the feeding ports at a desired location.

A stepper motor can function as the "feeder motor" or "food-delivery member" 120 to deliver food to the feeding ports when desired. Feeder motor 120, for example, when activated can perform a rapid 4 to 5 degree, clockwise/counterclockwise rocking motion (enhanced feed) or unidirectional circular motion (simple feed) of a plastic tube ("food-containing portion") with a small hole ("feeder" 122) to drop a few grains of food through the funnels of feeding portions 110 into the water.

Feeder 122 can be attached to the shaft of the feeder motor 120 mounted on a half-inch PVC tubing. To enable reward presentation (food drop) at different locations, the feeder motor can be mounted to a positioning arm 124, shown in FIG. 1 as a robotic, upside-down L-shaped arm, which can be rotated by a second stepper motor, designated as the "arm motor" 126, on whose shaft the horizontal arm 124 is mounted. In this manner, for example, the arm motor 126 can rotate the feeder motor 120 to any location in a 360 degree arc. If desired, linear translation of the feeder motor can also be provided, thereby allowing the feeder motor to move to any desired location above tank 102.

Arm motor 126 can move the arm to a user-specified angular position measured in degrees from an arbitrary starting point above the tank (e.g., 0-360 degrees). Feeder 122 can be activated either after a delay (measured in seconds from the start of the recording) for classical conditioning or after the fish triggered the motion sensor for operant conditioning. If successive feeds are desirable at different locations, arm motor 124 can move to the location specified in degrees and desired speed after a user-specified delay, whereby the feeder can be reactivated as desired.

The system described herein provides an automated electro-mechanical research apparatus for analyzing or training behavior for animals, such as zebrafish. The moving robot arm can dispensing fish feed (e.g., a food reward) to reinforce behavior. For behavioral stimulation, it can be equipped with one or more LED lights and/or an underwater audio transducer. The sensors discussed above (e.g., proximity sensors) can detect the movement of zebrafish towards or at a training target. As discussed above, the sensors can operate by signal reflection so that the presence of the animal between the sensor and reflect interrupts the sensor signal and indicates the presence of the animal at the target location. In some embodiments, the activation of another stimuli (e.g., food delivery, auditory and/or visual) can be triggered either during interruption of the signal (e.g., a food reward when the animal is in the target area) or triggered when the signal is not interrupted (e.g., continuous visual stimuli until the animal breaks the reflection by entering the target area). As discussed in more detail below, the control system (e.g., the hardware and accompanying software) can be configured to automatically operate the LED light(s), audio transducer, and/or robotic arm according to a desired training protocol.

Systems and Methods for Controlling the Training Apparatus and its Operation

The systems and methods described herein are operated via a control system that regulates or directs the actions of the system. For example, in one embodiment, Arduino, a dynamic microcontroller, can be used to enable the control of external devices such as stepper motors, servos, sensors, LED's, etc. For example, a plurality of LEDs (e.g., 1-3 LEDs) and one or more sound channels can be programmed independently to present visual and/or auditory stimuli at any time from the start of a video recording event. While capable of controlling external devices, Arduino is not, however, designed to control programs installed on a PC. For the purposes of monitoring behavior and presenting auditory stimuli, automated, synchronous control of PC-based software can be performed using other systems, such as Debut Video capture (NCH software) & VLC media player (VideoLAN). In some embodiments, other software was used as a proxy to synchronize timing of external device functions with actions by installed programs (e.g., GoBetwino), which was configured to compensate for this limitation when using Arduino sketches alone to control the training and testing without the custom-written JAVA software.

Alternatively, a custom program written in JAVA operating within an Arduino-integrated software development environment can be utilized to control training and testing of animals using the systems and methods disclosed herein. For example, Ardulink, an open-source JAVA library, can be used to facilitate real-time control of Arduino UNO (or LEONARDO) microcontrollers. Ardulink features a collection of Java SWING components pre-configured to communicate with Arduino over USB, allowing the rapid development of a graphical user interface (GUI). Together, Arduino and Ardulink can be used to control all outputs including both stepper motors (Stepper Motor: Unipolar/Bipolar, 200 Steps/Rev, 57×41 mm, 5.7V, 1 A phase; Pololu Robotics and Electronics, Inc.), auditory, and visual stimuli.

Since Arduino communicates with the PC via USB port, the custom program can be used to establish a connection to the USB port, and for the duration of a trial, maintain an uninterrupted line of communication with Arduino. This can enables live sensor and event feedback without any additional hardware that may otherwise be required for feedback. Furthermore, it can permit users to pause, make changes to parameters, and resume trials without having to end and start a new trial.

Figure 3:
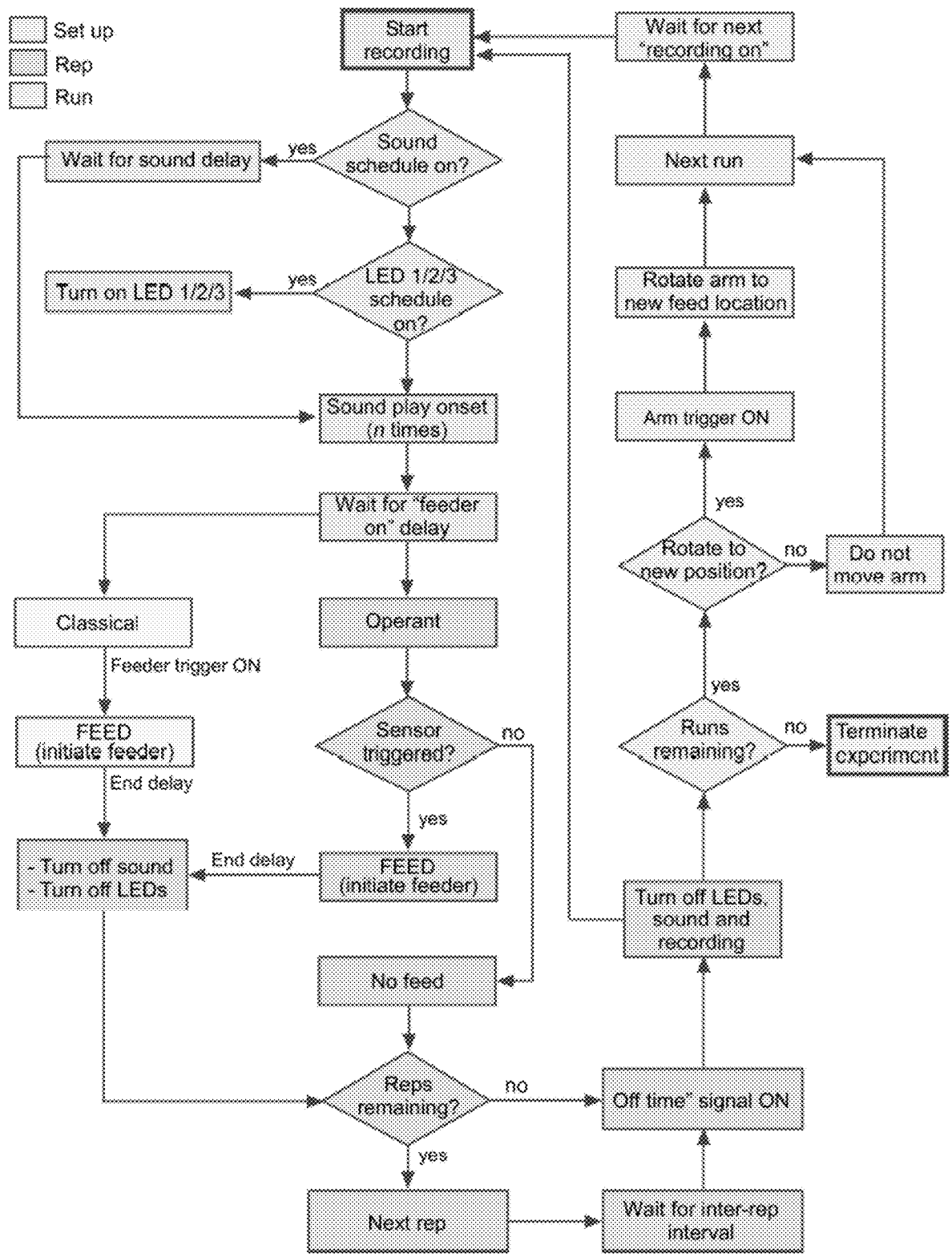
FIG. 3 is a flowchart depicting an algorithm for automated training.

The software can be configured to set up delay-based triggers to plan and execute the scheduled events. For example, FIG. 3 is a flowchart depicting an algorithm for automated training, which includes a training procedure that assigns user-defined delays for turning "on" and "off" light and sound or other types of stimulus as part of the set up (green), and with stimulus repetition (blue) providing multiple opportunities in close succession with each of multiple daily runs (pink) for the animal to learn the task.

Events are organized as a series of "trials", "runs", and "reps". Additional runs can be planned using the same or modified parameters by specifying the time and day for a sequence of runs. If operant conditioning is selected in the interface, the time window during which sensor must be triggered to elicit a food reward is time-limited to the stimulus duration. If the fish does not trigger the sensor during this time window, the stimulus repetition is terminated, and after a user-specified delay is followed by the next rep for that run or alternatively, the next "run". If classical conditioning is selected, food is reward is given after a fixed time delay and the software waits for the next run.

Runs begin by starting a video recording. The start time of a recording is used as a reference point for delay-based actions. The timing for stimulus presentations is user-specified by means of a delay (in seconds) from recording onset via the user-defined scheduler. This way, LEDs and auditory stimuli can be presented independently and/or simultaneously. As an event continues, depending on the type of behavioral conditioning chosen, either sensor triggers or additional delays are employed to precisely plan actions such as time of food reward, arm re-positioning, and next rep.

Figure 4A:
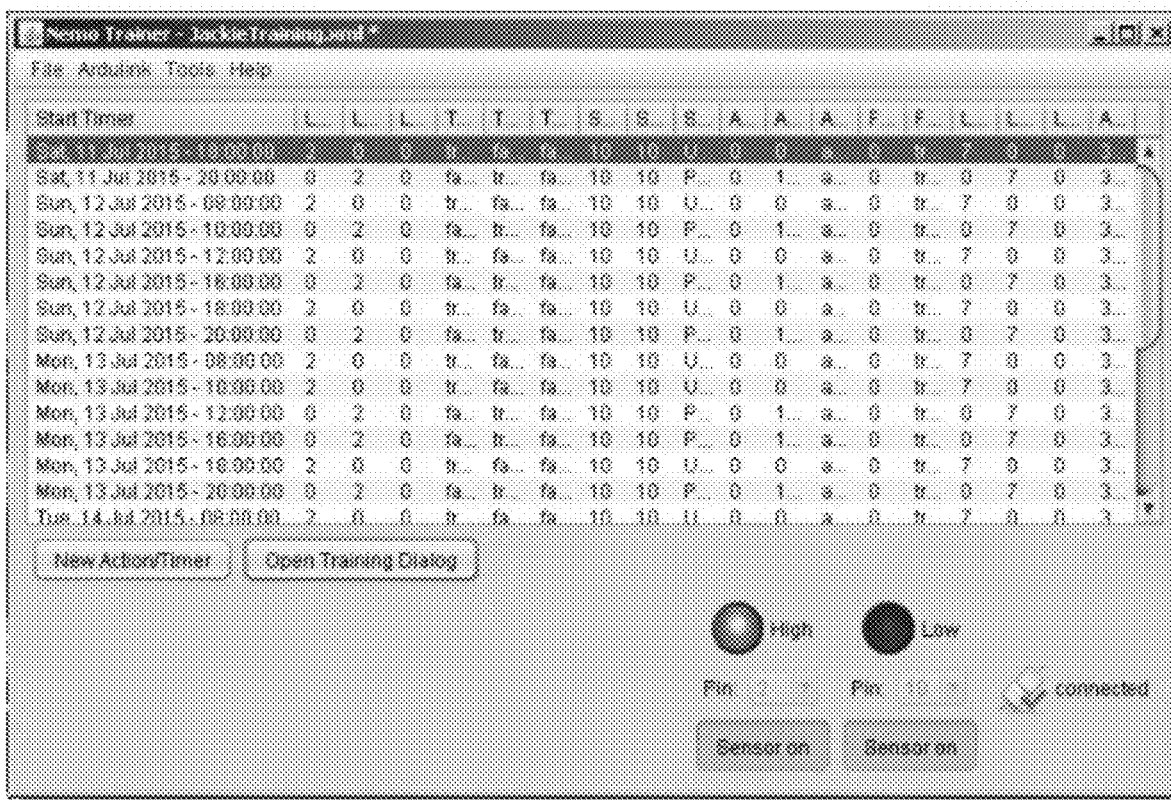
Figure 4B:
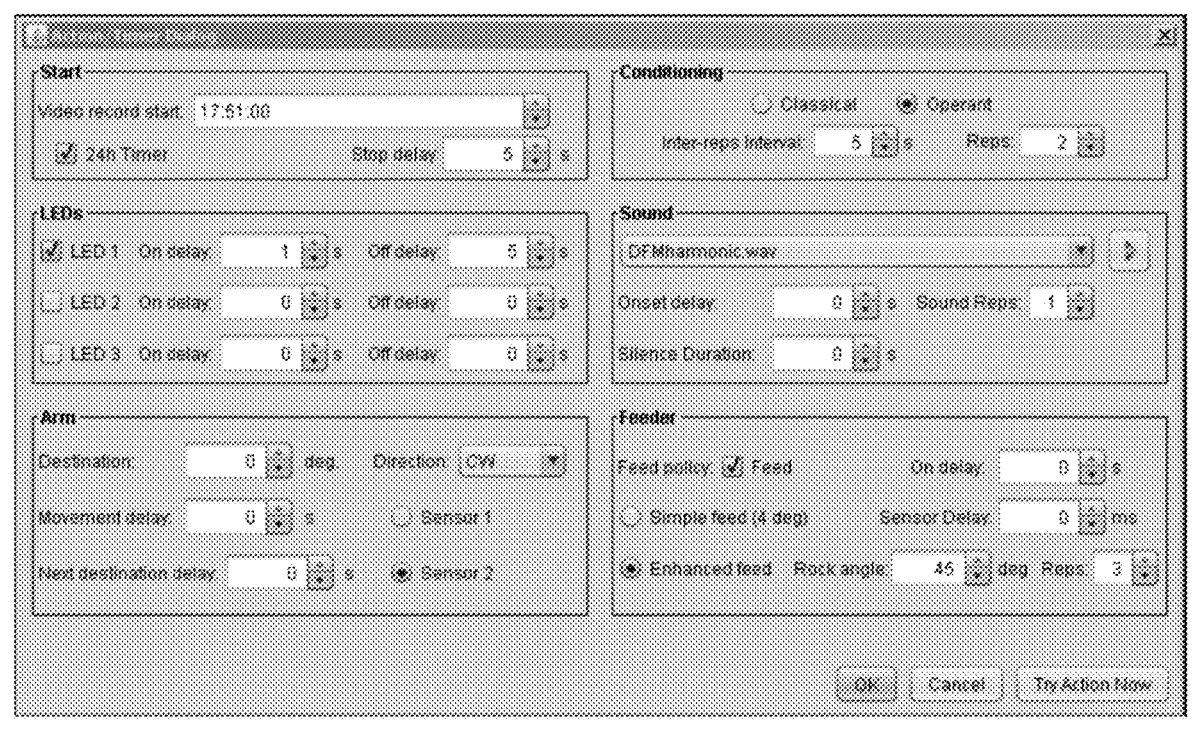

FIGS. 4A and 4B illustrate screen captures of an exemplary user interface, including a training schedule (FIG. 4A) and control of actions and sensors (FIG. 4B) for associative conditioning permitting user-definable settings that enable classical or operant conditioning via customized multi-day scheduling and precise control of stimulus parameters for training. Additional user-specifiable interface settings include record end delay, LED selection and duration, sound selection and duration, degrees of arm rotation, and simple or enhanced feed. Reps conclude with the end of a video recording, the length of which is calculated using the sum of all delays and triggers plus the additional delay to extend the recording if desired. Once the number of reps specified per run is reached, the run is concluded and the software waits until the time of the next scheduled run to begin the same. In some embodiments, for example, experiments can comprise 4- to 5-day trials of 6-8 daily runs of up to 6 reps. The system, however, has the capability to automatically execute scheduled trials for many weeks without any user intervention. The user-defined scheduling interface can permit manual entry of all trial control parameters. This interface allows users to comprehensively plan and automatically begin multiple trials.

As shown in the exemplary user interface of FIG. 4B, assignments for up to 2 sensors and 3 LEDs can be changed using drop-down menus. Of course, control of additional sensors or actions beyond those shown in FIG. 4B are contemplated. Direction and speed of motor movement can also be user determined for the duration of a trial.

In some embodiments, testing windows and features can be provided to ensure the precision needed for arm placement, food delivery and all other training parameters are operating as desired before starting a trial. The testing window can allow users to independently test LEDs, sound presentation, video recording software, motor movement, and any other parameter or operation of the training apparatus. In addition, users can specify the parameters of a run and conduct a test run, which in addition to the previously mentioned functions, also tests delays and sequence of events, to ensure that all values specified for a run meet their requirements.

Exemplary Training Paradigms and Analysis

In some embodiments, a 2-6 day (e.g., 4 day) training paradigm can include 4-8 (e.g., 6) training sessions per day. Due to the zebrafish's visual acuity, LED's can also be paired with auditory stimuli. In one embodiment, three distinct sounds were synthesized using Wavtones.com, and filtered and normalized using Audacity. Sounds 1 & 2 were paired with specific food delivery locations, and sound 3 was played without food delivery to discourage nonspecific association of sound with food delivery. On day 1, sounds 1 and 2 were presented in an alternating order within consecutive runs for operant-controlled food delivery at alternating locations. During any repetition of a run, if a fish triggered the correct sensor during sound playback, a small food reward was delivered automatically within a second. On day 2, in addition to alternating sounds, two seconds after the onset of sound presentation, an LED, either green or red, was illuminated where food was delivered.

The LED, a visual stimulus, can provide the directional cue and can follow the auditory target cue to promote paired associative learning. Zebrafish are highly dependent on their visual system to hunt for food so a visual stimulus can facilitate testing of other sensory modalities. Each run served as an opportunity for fish to associate an auditory or visual cue with food reward. In one embodiment, runs were scheduled to take place at 8 AM, 10 AM, and 12 PM, followed by a break to restore motivation, and three more runs at 4 PM, 6 PM, and 8 PM. Within each run, a user-specified number (e.g., 4 to 6) of repetitions of the same control parameters helped shape fish behavior. LEDs were not illuminated during any runs on day 5 when testing auditory discrimination learning.

Videos from every repetition can be automatically recorded (e.g., using Debut Videocapture). Following onset of recordings, a delay (e.g., a 10-second delay) can enable baseline observation of behavior. After this, sounds and/or LEDs can be presented to give the fish the opportunity to earn a food reward. Recordings can be terminated after food delivery (e.g., after 5 seconds), resulting in videos approximately 30 seconds long. Videos can be analyzed automatically (e.g., using iDTracker) or manually (e.g., using wrMTrck, an Image-J plugin) to track fish movements and record frame-by-frame positional coordinates.

With behavior recorded prior-to and post sound- and LED-onset, arousal can be compared using swim speed and darts. In one embodiment, to measure behavioral choice learning, three spatial zones in the videos were specified based on the feeding locations in the tank. Two time windows were selected for analysis across videos, a window prior to and another post sound and/or LED onset. During these two time windows, fish proximity to food delivery locations was calculated based on either manual or software extracted coordinates of fish locations within individual frames. Several tracking devices were tested. Three of the available programs, Ctrax, idTracker, and wrmtrck, a plugin for Image-J, were all able to track multiple (4 to 8) zebrafish. Image-J was ultimately utilized to obtain verifiable quantitative data on fish position. In our experiments, each relatively short recording (e.g., 10-30 s) occurred at 30 fps. Several zebrafish were trained over a relatively short time period (3 to 4 days) to respond robustly to test stimuli. From the first feeding on day 1 of training and onwards, zebrafish showed a significant increase in arousal following sound onset.

Figure 5A:
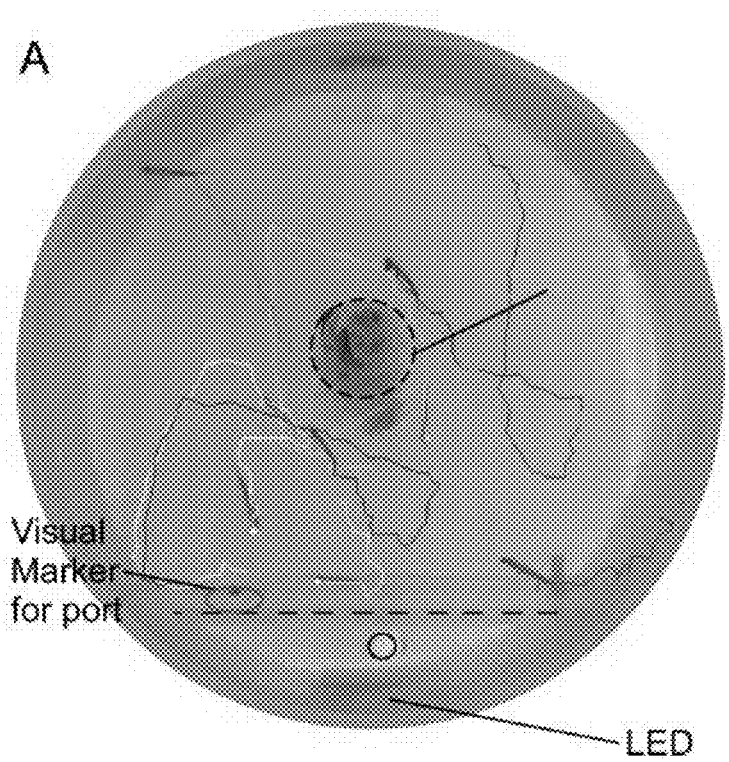
FIGS. 5A and 5B illustrate exemplary instances of tracking individual fish behavior from video recordings before presentation of a sound stimulus and after.
Figure 5B:
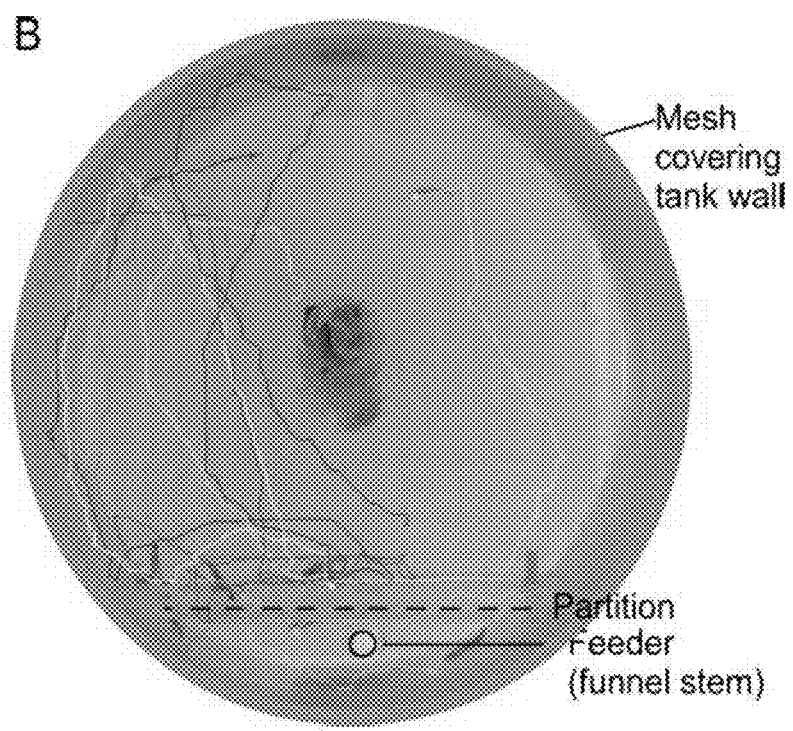

Swim trajectories for 6 fish in different trials are shown in FIGS. 5A and 5B. FIG. 5A illustrates exemplary instances of tracking individual fish behavior from video recordings before presentation of a sound stimulus and FIG. 5B illustrates exemplary instances of tracking individual fish behavior from video recordings after presentation of a sound stimulus. The presentation was of a short (e.g., 4 s) duration, sound stimulus and tracks begin at locations is before and terminate 4 s after sound onset.

Figure 5C:
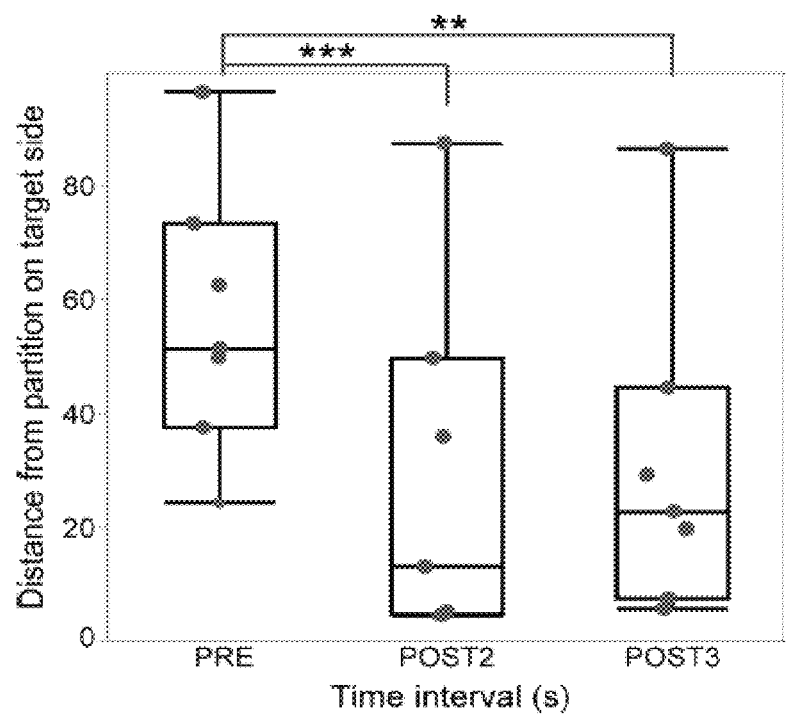
FIG. 5C illustrates a box plot and jittered scattergrams showing distances of fish from correct (target) side after training in response to the presentation of sounds within a single trial.

FIG. 5C illustrates a box plot and jittered scattergrams showing distances of 6 fish from correct (target) side after training in response to the presentation of sounds within a single trial. Data was obtained from is before (PRE) and during the second (POST2) and third (POST3) second post stimulus. Shorter distances from target indicate better learning. On average, fish were closer to target during POST2 and started to wander away during POST3. Data from two fish trapped behind dividers are not included in this plot.

Learning was indicated by the significant proximity to the target side in the 2- or 3-second period from onset of the audiovisual stimulus as shown in FIG. 5C. Almost all individuals swimming randomly in different locations and directions within the tank (FIG. 5A) oriented themselves with different latencies towards the correct direction following onset of LED/sound cues (FIG. 5B), where correct direction is defined as the direction corresponding to the side of the tank where the food was delivered when a specific sound was played through the underwater speaker and/or the appropriate LED was placed. For classical conditioning, sham training (random presentation of sounds and/or LEDs) for pre-training condition showed no significant difference overall in either orientation or distance from the vertical plane at which feeder is located is and a total of 3 s pre- and post-stimulus presentation in two different cohorts (one-way ANOVA; P=0.793; n=6 and one-way ANOVA; P=0.719; n=6). Shams were sounds which were not associated with the reward and were presented randomly to make the reward association specific to the sound to be tested. Immediately following sound and LED onset, fish tended to follow a preferred swim pattern. Sometimes this involved swimming to the center of the tank first and then to the zone of their choice, which took approximately two seconds. Therefore, the time window for analysis after sound and/or LED onset was selected accordingly. Increasing the length of time used for analysis or delaying the analysis to begin after 3 seconds from sound onset incorporated movement of fish back to the opposite side of the tank.

After introducing the fish in the test tank, we presented food once at each of the feeding locations to allow fish to orient to the training environment. As explained in the methods section, in this paradigm a fish freely triggered a sensor to elicit a reward, which was accompanied by presentation of sound and/or light stimuli. Most fish failed to respond successfully to sound presentation in the early runs, but their attempts at triggering the sensor as well as success rates increased within a 10 to 12-hour time window and peaked within a 24 to 48-hour time frame.

Figure 6A:
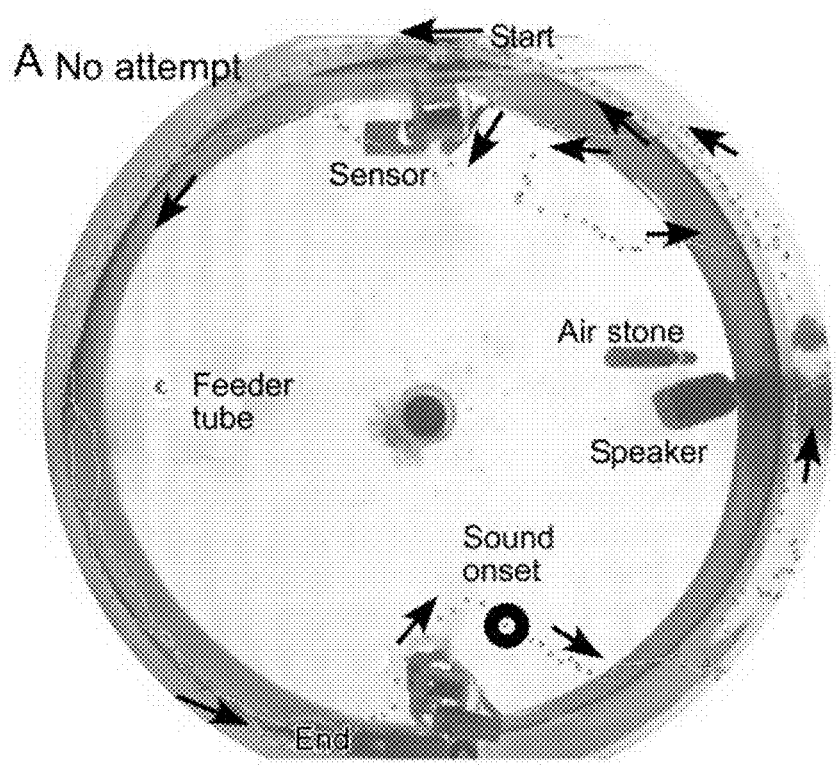
FIGS. 6A, 6B, and 6C illustrating exemplary instances of tracking a single fish in three runs during operant conditioning.
Figure 6B:
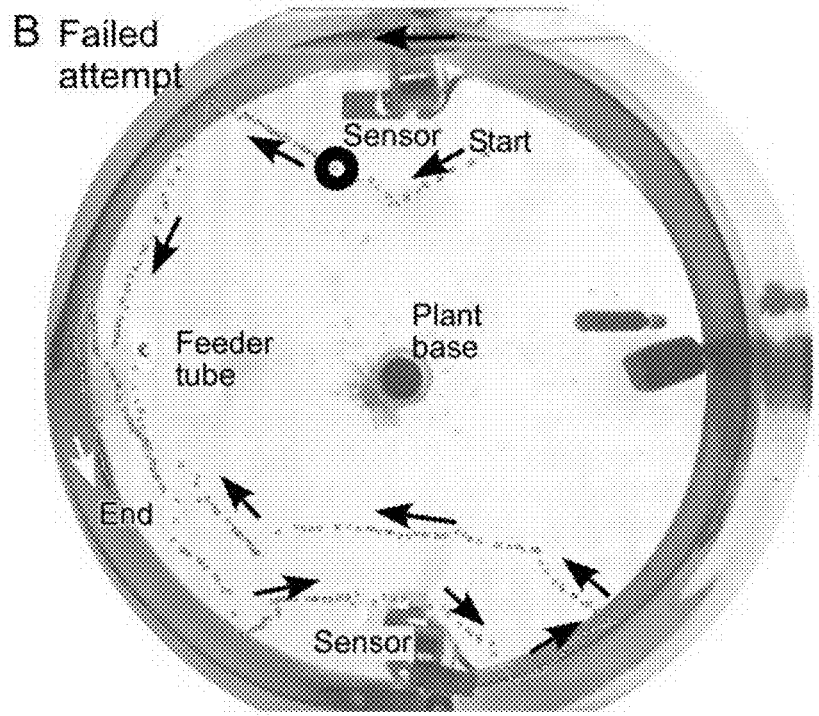
Figure 6C:
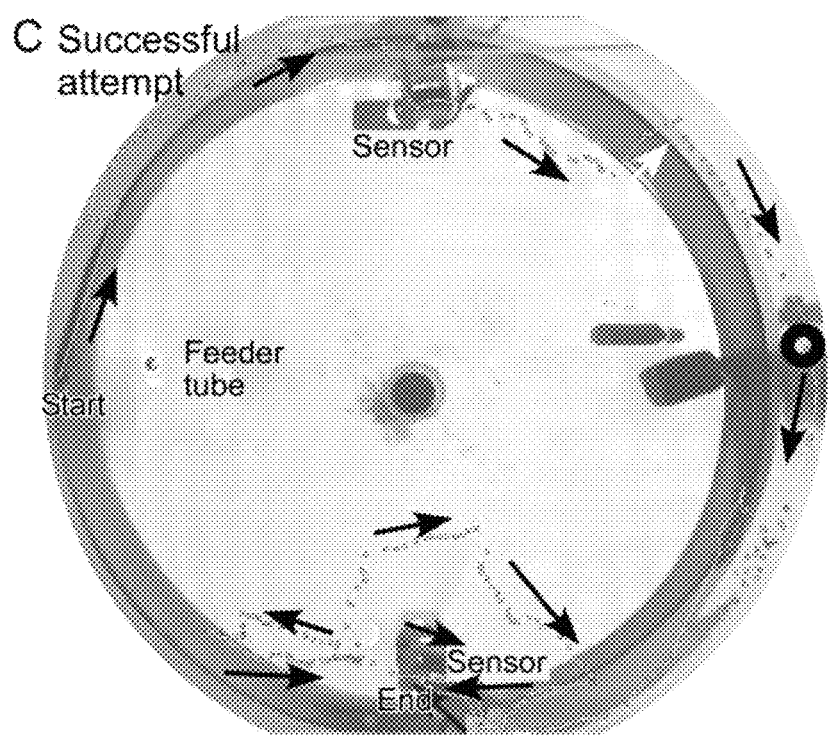

FIGS. 6A, 6B, and 6C illustrating exemplary instances of tracking a single fish in three runs during operant conditioning. In FIG. 6A, the fish does not show any overt response to the presentation of a sound stimulus, In FIG. 6B, the fish shows awareness and attempts to trigger the sensor on the correct side, but is unsuccessful, and in FIG. 6C, the fish successfully triggers the sensor twice to receive a food reward and swims to the feeder location to retrieve the reward.

Swim direction and trajectories were visualized using manual data entry from Image-J from individual frames of a 30 frames/s video recording. In the "no attempt" (FIG. 6A), the animal does not respond to the sound. In the "failed attempt", the animal responds to the sound and attempts to trigger the sensor and moves to the right location, but fails to trigger the sensor (FIG. 6B), and in the "successful attempt", it succeeds in triggering the sensor twice by circling around it to dispense a food reward and then around it another time before proceeding to feeding location (FIG. 6C).

Figure 7A:
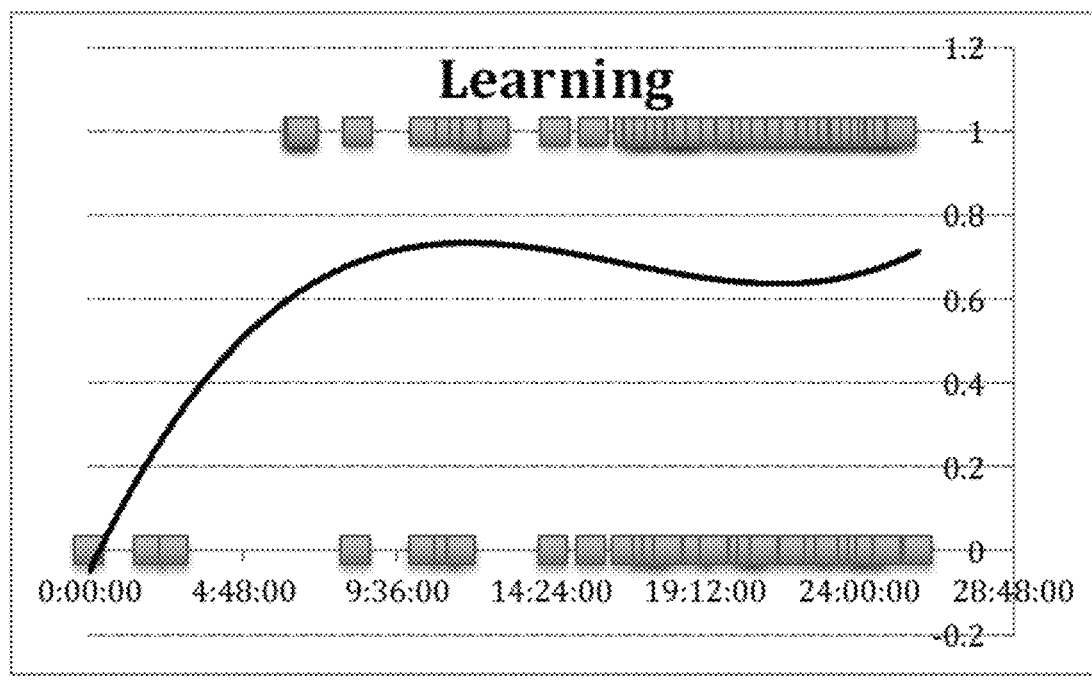
FIGS. 7A and 7B show exemplary results of a general learning trend for zebrafish.
Figure 7B:
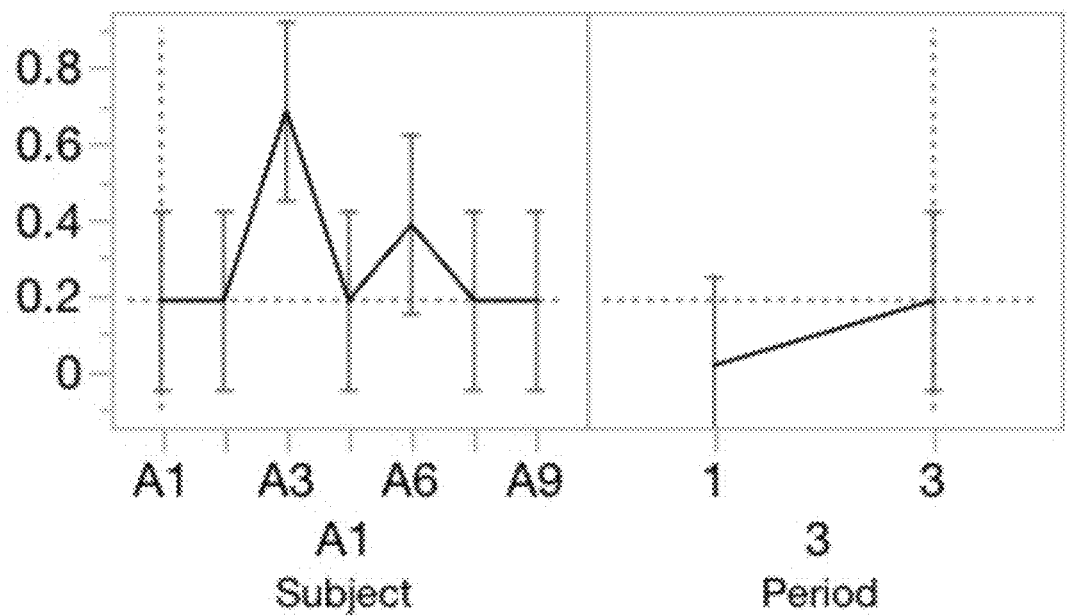

FIG. 7A shows successes and failures for a single trial over time and, in particular, illustrates a cubic fit to show the general learning trend for a binomial distribution of failures (0) and success (1) of trials for one zebrafish. FIG. 7B shows the results of a statistical analysis using repeated measures ANOVA to test main effects of test subject (fish) and "cumulative time" on learning.

FIG. 7B is a profile plot generated from a repeated-measures analysis of variance (ANOVA) showing the success rate (mean±stand. deviation) of 7 zebrafish tested using the systems and methods disclosed herein (FIG. 7B, left). Between subject learning rates were highly variable, yet success at triggering the sensor (stimulus-driven directed swimming) was significantly higher ($P<0.05$) over time (rejection of null hypothesis for no differences). Significance ($P<0.05$; n=7) was typically reached after 10 test runs. A linear model regression yielded a good fit ($R2=0.85$) for actual vs. predicted responses. Overall, there was a significant ($P<0.05$) effect of subject because of one individual ("A3") (FIG. 7B, right). Significant ($P<0.05$) learning was also observed based on success rates for triggering sensor within the 8 s time window when averaged for the first and third set of 5 tests occurring within a 12 to 24-hour time frame (time interval over which learning occurred varied with individual fish).

In summary, the systems and methods disclosed herein are efficient and effective in demonstrating the ability to associate sound stimuli and/or visual markers by various animals such as zebrafish. Furthermore, even in the absence of LEDs, zebrafish used available visual stimuli to orient themselves towards the feeding location with a relatively high degree of accuracy as determined by rough orientation of head direction towards the correct side. They demonstrated rapid spatial orientation and swimming in response to reward-conditioned visual and auditory stimuli.

Animal learning and, in particular, fish-based models, are relevant to genetics, neuroscience, pharmacology, toxicology, and behavioral neuroscience, and valid, reliable, and efficient methods of behavioral assessment such as those provided by the systems and methods disclosed herein are desired. In addition to its potential for clinical applications, automated training paradigms, such as those presented herein, facilitate examination of general principles of goal driven behavior, decision making within solitary and social conditions, sensory discrimination capabilities as well as neural mechanisms of learning and memory.

In addition to the systems and methods disclosed herein, the scheduling interface facilitates a high level of customization and allows one to set up and visualize the training paradigm for as many days as required. In contrast to the classical methods, in the embodiments of operant conditioning paradigms disclosed herein, each instance of observation/response in the training environment reinforces the basic behavioral pattern the fish must learn. Thus, it can produce robust learning because fish are immediately rewarded for discriminating between two or more sound or visual cues in their environment. One of the limits of prior classical conditioning methods is that traditional methods of testing for associative learning after a specified training period, required the presentation of, for example, the light stimulus without the reward. However, each such test represents to the fish a counterexample to the very association one is hoping to achieve, leading to forgetting. Thus, in traditionally used approaches, the testing phase slowly counteracts whatever learning took place previously.

In certain paradigm embodiments disclosed herein, data can be recorded continuously and be available off-line to monitor learning throughout the experiment and make planned interventions to modulate the learning process. Such protocols help avoid potential extinction effects, which can distort the results. This can be readily done using the automated systems disclosed herein because various learning parameters, such as head-turns, relative position within tank, distance from target, etc. can be rapidly assessed, and facilitate the ability to determine optimal training and experiment duration.

Since the training and testing, as used here, involves sensory discrimination, memory, recall and locomotor systems, defects in any of these can be detected during the performance of stimulus-directed swimming. Moreover, the apparatus can be used with single individuals as well as small groups of 4 to 8 zebrafish during classical conditioning, allowing one to test the effects of drugs on transgenic models of autism spectrum disorders. Zebrafish models for Alzheimer's and Parkinson's are also well developed and tested primarily at the cellular and molecular levels. The systems and rapid training paradigms disclosed herein add to the possibility of testing drug treatment efficacy on behavioral outcomes.

Zebrafish are very good at spatial memory tasks as shown by the simple method of delivering food at alternate locations within a tank. Incorporation of a specific directional component, as is possible in the systems and methods disclosed herein, has the potential to designate multiple locations within a tank and have the fish make a series of decisions or choose between multiple locations to swim to, depending on the number of auditory or visual stimuli to be tested. For example, in some embodiments, the choice can depend on either the side an LED was turned on or the type of the sound presented. The sound type (target stimulus) was in turn associated with the location and/or color of the LED.

The training and testing method adopted here can also be used to advance the understanding of the behavior and neurobiology of any sensory and motor system in any fish species. The hearing ability of fish, in general, is well established and considered to be important for their survival in the aquatic environment. However, their ability to discriminate between complex sounds is not well understood and the systems and methods disclosed herein can advance our understanding of these behavioral and neurobiological systems. Furthermore, since fish, unlike mammals, are able to regenerate hair cells within their sacculus, a sound stimulus-based behavioral assay can also be used to track regeneration and reestablishment of function after hair cell ablation and drug treatment studies without sacrificing animals. Similarly, visual discrimination can be rapidly tested by using multiple, different-colored LEDs along the diameter circumference of the tank and rewarding the fish only when they swim to an LED of a particular color at a specific location in the tank.

Imaging and Tracking Systems

As discussed above, one or more video cameras (e.g., Logitech HD Pro Webcam) can be positioned below the animal tracking area (e.g., tank) and/or at some other location that provides a sufficiently unobstructed view (e.g., above or to the side). The video obtained from the camera can be used to track the movement (e.g., swimming) of one or more subject animals (e.g., zebrafish). The tracking system can be integrated with the systems and methods disclosed herein to assess the results of the training systems. Different tracking software programs can be used, such as Ctrax, which uses threshold settings, and idTracker, which uses contiguous pixel value parameters to identify and track animal movement.

Ctrax, an open source, machine vision program initially created to track and estimate the positions and orientations of flies. This program allows the behavior of animals to be quantitatively analyzed by continuously tracking their movement. It can also continue tracking even when animals move from one location to another and can maintain identities indefinitely while tracking. This is a useful feature when tracking zebrafish from above or below since they can also move in three dimensions and momentarily "disappear" by twisting their body or crossing another individual. Ctrax operates on an interactive basis and allows one to examine the settings of the tracking system, the region in which animals are tracked, and the different ways in which animals are identified. Thus, the way in which Ctrax operates and how it identifies and tracks fish is impacted by many features that can be adjusted, with the effect of each alteration being clearly visible. Since this system was originally created to track flies, it must be appropriately configured to properly track zebrafish.

When using Ctrax to track zebrafish there are several issues that are important to note. Since flies and zebrafish move in different ways, at times when a zebrafish turns and its body becomes too curved, the program loses track of the fish. Likewise, even without the fish turning, Ctrax at times loses track of the fish and re-identifies the fish after several frames and continues tracking. However, the two different tracks can be rejoined to illustrate the behavior of one fish, despite several missing frames. When the system begins to lose track of a fish, it draws random lines to areas near the fish, possibly trying to relocate the same animal, but this erroneous data must be visually identified and rejected. When tracking zebrafish, many sources of erroneous data can be avoided by adjusting the settings of the Ctrax program. Ctrax has a Tracking Wizard that allows you to identify whether the fish or the background are darker, the region where Ctrax should track the fish, the background area the fish movements are analyzed within, as well as the high and low contrast thresholds that Ctrax should employ. With the correct features and adjustments, Ctrax can be a useful tool for analyzing the position and behavior of zebrafish. Furthermore, with the ability to use Batch Processing on Ctrax, many videos can be analyzed effectively and efficiently using this program.

One of the major challenges with tracking zebrafish, is accurately identifying individuals once they swim past or over one another. iIDTracker resolves this issue by determining and assigning a specific fingerprint to each individual fish and using that fingerprint to identify the individual throughout the tracking process. Once IDTracker is opened and a video file is selected for tracking, there are several parameters that must be adjusted to ensure proper data collection. The number of fish in the video to be tracked must be entered in the "Number of Individuals" box. It is important to keep in mind that the number of reference frames must be less than the number of frames that are being tracked. These settings can be saved and used later or the "Start" button can be used to begin tracking. Once tracking is complete, a figure of the fish tracks will appear and files containing tracking data will be saved in the folder containing the tracked video. It is recommended that each video be placed in its own individual folder before it is opened in IDTracker. Homogenous lighting and background conditions can provide improved tracking results whereas a greater contrast between the fish and their background allowed for more effective segmentation and tracking. Therefore, adjustments of the lighting for viewing and video recording in the observation arena is desirable to optimize lighting conditions and improve tracking results.

As discussed above, Image-J software can also be utilized for manual tracking of zebrafish. Once a zebrafish recording is obtained, the segments where tracking is desired can be delineated and their start and end time noted. Once Image-J is opened and the desired video file is opened within the program, the video frames during which tracking will occur must be entered into a dialog box which asks for the entry of the starting and ending frame. Depending on how many frames per second are recorded by the video recording software, the starting frame and ending frame of the tracking period need to be determined.

Once the video is loaded and the desired frames set, from the "Plugins" tab at the top of the Image-J screen, Manual Tracking can be chosen. Once Manual Tracking is selected, the "Add Track" option was selected in the dialog box. From here on, a single fish can be tracked by repeatedly clicking at a specific point (e.g. center of head) of its image in successive frames to ensure precise and consistent tracking. Once the fish has been tracked for all of the designated frames, the "End Track" option on the screen was selected. To track another fish, the same process can repeated be pressed by selecting the "Add Track" option to start and the "End Track" option to terminate tracking. The program assigns each fish with a tracking number, chronologically ordering each fish that was tracked. As tracking is occurring, the coordinates of each fish were automatically recorded in a separate window that opens once tracking begins. It is important to keep this window open until all tracking is completed so that the data obtained is not lost. Once tracking of all fish is completed, the data file can be saved and reviewed (e.g., in Excel) for further analysis.

The Manual Tracking plugin can permit for visualization of the tracking that has been completed. Under the "Drawing" heading of the Manual Tracking screen, the options Dots, Overlay Dots, Progressive Lines, Overlay Lines, Dots & Lines, and Overlay Dots & Lines appear. Dots allow one to visualize the fish that is tracked as a colored dot at the place where it was clicked on in a specific frame. Progressive Lines provides an image of the fish position at a specific frame and all frames before that. This allows for visualization of the path of the fish from start till end. The Dot & Lines options is the same as Progressive Lines but provides a marker (dot) at the click location, allowing for frame-wise visualization of each track. All these options appear as colored dots on a black background but have an Overlay counterpart which presents the dots and lines with the video frames as the background. We used the Overlay Dots & Lines option to illustrate the navigational path of the zebrafish within the actual background. Image-J is limited to a maximum of 7 colors. Therefore, if more than 7 fish are tracked, colors will be reused.

Fulfilling the final requirement for an automated, user-defined training system, a custom sketch was written to control the PC-based software and external devices via Arduino. Functions defining arm movements, feeder movements, and power to LED's, were written according to the type of training to be conducted at each alarm (i.e. sham vs feed). Arm movement delay from the end of the prior run of the arm motor enabled adjustment of time following the end of the run delay as well as presentation of an auditory and/or visual stimulus. Gobetwino-specific commands defining PC-based keystrokes were incorporated into functions to control PC-based software, thereby allowing specific recording and auditory stimulus presentation durations.

Additional Details of Zebrafish Training Systems and Methods

Learning proceeds more rapidly if zebrafish are oriented to the setup by dropping food once or twice at the appropriate locations. Starting training as soon as fish are introduced into the tank and are still engaged in active swimming to explore their environment can improve learning. During this active swimming period, it is helpful for fish to learn that swimming in certain locations, i.e. near sensors, can result in stimulus and/or reward presentation. This, in effect, establishes that the environment is dynamic rather than static and thus leads to further exploratory behavior during a trial. Otherwise, if a fish has exhaustively explored its environment without any stimulus or reward presentation during this critical period, its behavior becomes more sedate and subsequently leads to decreased responsiveness during a trial. The systems and methods disclosed herein can automate early and/or immediate introduction of food rewards as fish are being oriented to the setup.

Due to the automated and modular nature of the systems and methods disclosed herein, it can be suitable for use in experimentation with other types of animals and small fish commonly used in laboratories, including goldfish and catfish that have been extensively used in behavioral and neuroscience experiments. Furthermore, the physical training apparatus can easily be expanded or reduced in size by using a longer arm and a larger tank to house and train more animals (or fish) simultaneously. In some embodiments, the motor is powerful enough to hold up to 4 kg/cm, which can handle the additional weight by a longer, heavier arm. Larger or smaller motors can be used, depending on the particular circumstances of the setup.

Thus, the systems and methods disclosed herein provide an automated training and testing arrangement whereby freely swimming zebrafish (or other animals) can be tested with stimulus-dependent directional memory tasks, and, in particular, to test the ability of zebrafish to discriminate between different colored LEDs and pure tones. Zebrafish are attracted to LEDs and can discriminate between complex sounds, such as upward vs. downward FMs that are matched in bandwidth and sweep rate. Zebrafish can also learn to respond in directional memory tasks in less than five days, and sometimes in less than three days.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. A monitoring system for tracking movement of one or more animals, the system comprising:
   an enclosure configured to contain the one or more animals;
   a plurality of proximity sensors positioned within the enclosure and configured to detect the presence of the one or more animals at a target location and at least one other location;
   a feeder system configured to deliver a food reward into the enclosure;

a camera configured to record the one or more animals in the enclosure;

at least one auditory stimulus device configured to introduce a sound stimulus in response to a detection of the presence of the one or more animals at the target location;

at least one light stimulus device configured to introduce a light stimulus in response to a detection of the presence of the one or more animals at the target location; and a control system configured to receive an input from at least one of the plurality of proximity sensors and control the delivery of the food reward from the feeder system based on the input, wherein the enclosure comprises a fish tank.

2. The monitoring system of claim 1, wherein the plurality of proximity sensors include a reflector that is configured to detect the presence of the one or more animals at the target location when a signal to the reflector is interrupted.

3. The monitoring system of claim 1, wherein the feeder system comprises a food-containing portion and a food-delivery member that, upon receiving a food-delivery signal from the control system, causes the delivery of the food reward from the food-containing portion to the enclosure.

4. The monitoring system of claim 3, wherein the feeder system comprises a positioning member that is configured to move the food-delivery member from a first position to a second position, wherein the movement from the first position to the second position permits the food reward to be delivered in different areas of the enclosure, and the feeder system is configured to receive a positioning signal from the control system to adjust the location of the food-delivery member.

5. The monitoring system of claim 4, wherein the positioning member comprises one or more motors that are configured to adjust the location of the food-delivery member by rotating a feeder arm.

6. The monitoring system of claim 1, wherein the fish tank comprises a circular enclosure with a clear bottom, and the camera is positioned below the enclosure to capture images of the one or more animals in the enclosure.

7. The monitoring system of claim 1, wherein the at least one auditory stimulus device comprises an underwater output transducer configured to produce a sound output within the enclosure.

8. The monitoring system of claim 1, wherein the at least one light stimulus device comprises at least two LED members configured to produce different types of light within the enclosure.

9. The monitoring system of claim 1, further comprising a tracking system configured to receive a plurality of images from the camera and determine a movement pattern of respective ones of the one or more animals, and display the determined movement patterns on a display screen.

10. A movement tracking system for tracking the movement of one or more animals within an enclosure that contains water, the tracking system comprising:

at least two motion detectors configured to detect movement of the one or more animals at a target location within the enclosure and at one or more locations away from the target location;

a camera positioned below the enclosure and configured to record the movement of the one or more animals within the enclosure;

at least one auditory stimulus device configured to introduce a sound stimulus in response to a detection of the presence of the one or more animals at the target location;

at least one light stimulus device configured to introduce a light stimulus in response to a detection of the presence of the one or more animals at the target location; and a control system configured to implement a predetermined training program by controlling the operation of the camera, the at least one auditory stimulus device, the at least one light stimulus device based, wherein the enclosure has a bottom that is sufficiently transparent to allow the camera to record the movement of the one or more animals within the enclosure.

11. The tracking system of claim 10, further comprising a feeder system that delivers a food reward into the enclosure, wherein the control system controls the delivery of the food reward from the feeder system based on an input received from at least one of the at least two motion detectors.

12. The tracking system of claim 10, wherein the at least one of the at least two motion detectors include a reflector that is configured to detect the presence of the one or more animals at the target location when a signal to the reflector is interrupted.

13. The tracking system of claim 11, wherein the feeder system comprises a food-containing portion and a food-delivery member that, upon receiving a food-delivery signal from the control system, causes the delivery of the food reward from the food-containing portion to the enclosure at one or more food delivery locations.

14. The tracking system of claim 13, wherein the feeder system comprises a positioning member that is configured to move the food-delivery member to at least a first position and a second position, the first position being a position that permits the delivery of the food reward to a first food delivery location and the second position being a position that permits the delivery of the food reward to a second food delivery location, and the control system is configured to pair the delivery of the food reward to the first food delivery with a first stimulus and pair the delivery of the food reward to the second food delivery with a second stimulus that is different from the first stimulus, wherein the first stimulus and second stimulus are provided by the at least one auditory stimulus device, the at least one light stimulus device, or both.

15. The tracking system of claim 14, wherein the positioning member comprises one or more motors that are configured to adjust the location of the food-delivery member by rotating a feeder arm.

16. The tracking system of claim 10, wherein the at least one auditory stimulus device comprises an underwater output transducer configured to produce a sound output within the enclosure.

17. The tracking system of claim 10, wherein the at least one light stimulus device comprises at least two LED members configured to produce different types of light within the enclosure.

18. The tracking system of claim 10, further comprising a display system configured to display a determined movement pattern of the one or more animals.

* * * * *